US011743998B2

(12) United States Patent
Rupp et al.

(10) Patent No.: US 11,743,998 B2
(45) Date of Patent: Aug. 29, 2023

(54) DEVICE WITHIN A POLE AND METHOD

(71) Applicant: CGF Counsel Group Frankfurt AG, Frankfurt (DE)

(72) Inventors: Harald Rupp, Langenbach (DE); Wilhelm Treiber, Untersiemau-Ziegelsdorf (DE)

(73) Assignee: CGF COUNSEL GROUP FRANKFURT AG, Untersiemau-Ziegelsdorf (DE)

( * ) Notice: Subject to any disclaimer, the term of this patent is extended or adjusted under 35 U.S.C. 154(b) by 294 days.

(21) Appl. No.: 17/065,842

(22) Filed: Oct. 8, 2020

(65) Prior Publication Data
US 2021/0112650 A1 Apr. 15, 2021

(30) Foreign Application Priority Data
Oct. 10, 2019 (DE) .................... 10 2019 007 058.5

(51) Int. Cl.
*H05B 47/17* (2020.01)
*H05B 47/19* (2020.01)
*H05B 47/105* (2020.01)
*F21V 23/04* (2006.01)
*F21W 131/103* (2006.01)

(52) U.S. Cl.
CPC .......... *H05B 47/19* (2020.01); *F21V 23/045* (2013.01); *H05B 47/105* (2020.01); *F21W 2131/103* (2013.01)

(58) Field of Classification Search
CPC .... H05B 47/19; H05B 47/105; H05B 47/175; F21V 23/045; F21W 2131/103; H04L 67/025; H04L 67/34; H04L 67/12; H04L 63/0876; G08B 13/1436
See application file for complete search history.

(56) References Cited

U.S. PATENT DOCUMENTS

| | | | |
|---|---|---|---|
| 8,558,413 B1 | 10/2013 | Lepard | |
| 2005/0015810 A1 | 1/2005 | Gould | |
| 2017/0272625 A1 | 9/2017 | Gravis | |
| 2017/0301220 A1 | 10/2017 | Jarrell | |
| 2019/0107273 A1 | 4/2019 | Agrawal et al. | |
| 2019/0166088 A1 * | 5/2019 | Krochik | H04L 41/0876 |
| 2019/0226672 A1 | 7/2019 | Abbott et al. | |
| 2019/0266595 A1 * | 8/2019 | Zand | G06Q 20/352 |

(Continued)

FOREIGN PATENT DOCUMENTS

| | | |
|---|---|---|
| DE | 202007011309 U1 | 9/2008 |
| DE | 102007018741 | 10/2008 |
| DE | 102014206074 B4 | 7/2019 |

(Continued)

OTHER PUBLICATIONS

Garderos, www.garderos.com, eight pages.

(Continued)

*Primary Examiner* — Minh D A
(74) *Attorney, Agent, or Firm* — Dickinson Wright PLLC

(57) ABSTRACT

A device, for example a coupling element in a network, such as a network switch or network router, which is arranged operably in a pole by means of its housing. Further, methods for putting the device into operation and methods for operating a peripheral using the device, as well as a computer program product for carrying out various methods.

18 Claims, 11 Drawing Sheets

(56) References Cited

U.S. PATENT DOCUMENTS

2019/0273313 A1    9/2019  Schwartz

FOREIGN PATENT DOCUMENTS

| EP | 2267969 | 12/2010 |
|----|---------|---------|
| EP | 2884312 | 6/2015 |
| EP | 3151509 | 4/2017 |
| WO | 2017200627 | 11/2017 |
| WO | 2019042728 A3 | 7/2019 |

OTHER PUBLICATIONS

German Patent and Trademark Office, Office Action dated May 12, 2022 for German Patent App. No. 10 2019 007 058.5, 21 pages.
European Search Report dated May 17, 2021 (May 17, 2021) issued on related European patent application 20200531.0 by the European Patent Office.

* cited by examiner

DEVICE WITHIN A POLE AND METHOD

TECHNICAL FIELD

This disclosure relates to a device, for example a network component, such as an active coupling element in a network, such as a network switch or network router, which is disposed, ready for operation, in a pole by means of its housing. This disclosure also relates to a method of operating the device. This disclosure also relates to a method of operating a peripheral using the device. This disclosure also relates to a computer program product.

BACKGROUND

A pole is a ubiquitous part of the urban and rural landscape. For example, a light pole may be arranged along a street or a sidewalk in order to help a motorist and/or pedestrian to better see or to have better orientation at night. Additionally or alternatively, a traffic sign used to control a traffic flow on the street or the sidewalk, such as traffic lights or a road sign, may be arranged on a pole. Additionally or alternatively, an observation or monitoring device used to observe and monitor squares or streets, such as a camera or a traffic counter, may be arranged on a pole.

Such a pole is preferably an element of a so-called smart city concept. Smart city is a collective term for a holistic development concept that aims to render a landscape, in particular cities, efficient, technologically advanced, ecological, and socially inclusive. These concepts should be energy-efficient, low-emission, safe and cost-effective in order to enable future projects such as area-wide broadband networking, extensive e-mobility, traffic observation and/or monitoring and/or increased security.

The smart city concepts always require a network. This network is a critical network that may be exposed to cyber-attacks. The problem with the known solutions is that the communication between a remote network component, such as a server, a basic network component (backbone component), and a peripheral is no longer secured. An attacker who wants to manipulate the peripheral, for example, is not yet being recognized by the remote network component and may thus cause considerable damage in the network, for example by manipulating a light or traffic light control, sabotaging a charging process for an electric vehicle, and/or unauthorizedly diverting data from sensors. The security-relevant data used in data communication, such as private keys, certificates, IP addresses or passwords, could also be read out in an unauthorized manner.

All previous solutions aim to better secure the light pole itself, in particular with mechanical latches and locks or sensors on the pole door. Such solutions are expensive and also inefficient, since the poles are also set up in remote areas.

SUMMARY

Several objects include providing a device which, for example, as a network component in a smart city environment, renders data communication between a remote network component and a peripheral more secure. In particular, the device, for example a network switch or a router, is to ensure that an attack on or attempt at manipulation of the data communication is detected at an early stage and reported to the remote network component. In addition, it should not be possible to tap confidential or security-relevant information, for example from a memory of the device or from data provided by a peripheral.

Another object is compliance with data privacy, as publicly recorded data may be subject to confidentiality and must be protected from unauthorized access.

In addition, further use of existing infrastructure should be made, if possible. The replacement of already installed poles to provide additional functionality should be avoided. There should also be no structural changes to the existing poles, such as enlarging a pole door or attaching sensors or switching elements.

In addition, maximum functionality should be achieved with a minimum of effort, that is, wiring work in the pole should be reduced.

With the foregoing and other objects in view, various embodiments include a device, in particular a network component, arranged operably within a pole by means of its housing. The device includes a sensor for providing a sensor signal on the housing of the device. The device also includes a control unit inside the device. This control unit comprises at least one first data connection configured to transmit a data signal between the device and a network component remote from the pole. This control unit comprises at least one second data connection configured to transmit a data signal between the device and a peripheral. This control unit comprises a sensor signal port for receiving the sensor signal. This control unit is configured to forward data communication between the remote network component and the peripheral. The control unit is also configured to evaluate the received sensor signal, to recognize a change in the sensor signal and to alert the remote network component when the change in the sensor signal is recognized by the control unit.

In accordance with certain features, the device is an active network component of a network, that is, a physical device required for communication and interaction between the network component removed from the pole and the peripheral. The device may, for example, be or comprise a gateway, a router, a network bridge, a modem, a wireless access point, a network switch, a network distributor (hub) and/or a repeater. The device may also be or comprise a hybrid network component such as a multilayer network switch, a protocol converter, a bridge router, a proxy server, a firewall, a network address translator, a multiplexer, and a network interface controller.

In accordance with certain other features, the device is a network switch. For example, the network is a Metropolitan Area Network, MAN for short. The network may be configured in a specific bus topology, for example star bus or in series, so-called daisy-chaining. A daisy chain refers to a number of hardware components connected in series to form a network. The first component, i.e., the first pole, is connected directly to the remote network component. The other components, the other poles, are now connected to their respective predecessors (series connection principle), creating a chain, the daisy chain. Now, the signal to and from a device in a pole travels through its predecessors to the computing system.

In accordance with certain other features, the housing serves to protect the device against contact, intrusion of foreign objects and water as well as for shock resistance. For example, the housing has protection class IP67. Further, the housing enables the device to operate in an ambient temperature range from −20 to +85° C., ambient air humidity from 5 to 95%, and has a cooling capacity of 1.0 K/W.

In accordance with certain features, the housing has maximum external dimensions that allow for simple installation (installation) and also removal (deinstallation, maintenance, repair) of the device in a pole. Further, the housing has minimum external dimensions that allow the housing to serve as a heat sink for the device, with internal heat sinks or fans or expensive heat pipes being omitted, further miniaturizing the device and reducing its complexity.

In accordance with certain other features, the device is arranged within a stationary pole. The device is fixed in the pole. Herein, a pole is a structure with at least one hollow pillar-like or post-like region, the base area of which may be comparatively small compared to the height thereof. The pole is primarily used to attach functional units, such as lighting equipment (light pole for street lighting, floodlight, path light, luminous advertising) and/or units for monitoring and/or directing traffic (signposts, traffic lights, traffic lights, traffic signs, toll bridges, traffic counters) and/or electrical components (power lines, antennas).

In accordance with certain features, the device is, for example, an integral part of the pole or can be installed and removed as an additional component in the pole. For this purpose, the pole has a hollow portion accessible from the outside and can be closable with a pole door or pole lid. This means that the device is safely stowed in the pole and also protected against environmental influences such as moisture, cold and heat. In addition, the use of the existing infrastructure of the poles is continued and the replacement of poles to provide additional functionality is avoided.

In accordance with certain other features, the device is operably arranged in the pole. In this context, operably means that the device is supplied with energy and is permanently installed. According to some embodiments, the energy supply for the device is provided within the pole in addition to the energy supply for a functional unit of the pole. For example, the energy supply for the device could be diverted from the energy supply of a functional unit of the pole.

As mentioned above, the device comprises a sensor, also referred to as a detector or (measured quantity or measuring) pick-up or (measuring) probe. The sensor is a technical component being able to sense certain physical properties (e.g., amount of heat, temperature, humidity, pressure, sound field quantities, brightness, acceleration) qualitatively or quantitatively as a measured quantity. These variables are sensed by means of physical effects and converted into an electrical sensor signal that can be processed and provided by the control unit. In this case, the control unit may perform the conversion for provision or the sensor performs this conversion and provides the sensor signal.

For example, the sensor is attached to the housing. For this purpose, the sensor is arranged in the interior of the housing and configured, by means of a passage or a transparent partial region of the housing for the property to be detected, to detect the physical property existing outside the housing even inside the housing. Alternatively, the sensor may also be arranged in the housing if the detection of the physical property is not impaired by the presence of the housing, for example for detecting a movement of the device.

As mentioned above, the control unit has at least one first data port for transmitting a data signal. Additionally, the energy supply for the device or the control unit may also be received via this data signal in order to establish operability within the pole. The data signal would then be combined with a Power-on-Ethernet signal, for example.

In accordance with certain features, the at least one first data port is used to transmit a data signal between the device and a remote network component, such as a component of a basic network (backbone) and/or a data center and/or a server. The distance between the pole and said remote network component may range from a few meters to several hundred kilometers.

In accordance with certain other features, the at least one first data port is connected to a first port of the device, and the control unit furthermore has at least two first data ports, each configured to transmit a data signal between the device and at least the network component remote from the pole. Each first data port is connected to a first port of the device. Thus, the device may be connected to more than one remote network component or may provide a larger data bandwidth for the peripherals. The first port is, for example, a small form-factor pluggable, SFP, port for saving space.

As mentioned above, the control unit has at least one second data port for transmitting a data signal. Using this data signal, the device may also additionally provide the supply energy to the peripheral in order to establish operability. The data signal would then be combined with a Power-on-Ethernet signal, for example.

In accordance with certain features, the at least one second data port is connected to a second port of the device, and the control unit further has at least four second data ports, each configured to transmit a data signal between the device and a peripheral. Each second data port is connected to a second port of the device. The number of second data ports is not restricted herein and could also be eight, twenty-four or more. A device thus enables great functionality on just one pole. The second port is, for example, an RJ45 compliant port.

In accordance with certain other features, a data signal via each second data port may be encrypted individually. The data signals of different second data ports are therefore not visible among each other, so that different service providers can be connected to different peripherals via the same device without the service providers being able to eavesdrop on the data traffic among each other.

According to certain embodiments, any functional unit on the pole is regarded as a peripheral. The peripheral may be a sensor or an actuator. It may be a functional unit of the pole itself, that is, for example, a lighting means, a light sign system, a light signal system, a toll component and/or an antenna. In addition or as an alternative to the functional unit of the pole, the peripheral may also be a device to be installed on the pole, such as a traffic monitoring unit, an additional light signal control, a camera, a wireless network access point (WLAN-AP), a cellular base station, an electric vehicle charging station, and the like. For example, the peripheral may be a smart city component, such as a component of a smart real-world laboratory, with additional intelligent sensors that make it possible to sense a wide variety of information about the vicinity, in particular traffic, weather and the environment, and equip a stationary light pole to be a multimodal utility carrier with adaptive lighting, energy supply and broadband connection for various types of sensors.

Here, the peripheral includes, for example, sensors for measuring temperature, humidity, emissions, pollutants, road surface, etc. The peripheral provides, for example, information on the traffic flow as the basis for a (central or local) optimization of the traffic flow. The peripheral provides information, for example, in particular support in the search for free parking space or charging stations for electric vehicles or for an improved choice of means of transport, also in context of the current weather situation. The peripheral increases security, for example by targeted surveillance using cameras. The peripheral could be part of "gamification".

In accordance with certain features, the control unit of the device is configured to forward data communication between the remote network component and the peripheral, wherein this forwarding may be unidirectional or bidirectional. A standardized forwarding may be used, for example according to the IEEE 802.1x protocol, wherein a media access control, or MAC, address of a peripheral is used to secure the data communication.

According to certain embodiments, the control unit is configured to receive and evaluate the sensor signal from the sensor of the device. The control unit may itself perform a conversion of a physical effect sensed by the sensor in order to obtain an electrical sensor signal for evaluation. Alternatively, the sensor is already equipped with a conversion unit and provides an electrical sensor signal that is only fetched by the control unit. The sensor is supplied with energy via the control unit, via the device or via the sensor itself. The sensor may also be operated with energy supplied via an energy harvesting process.

In accordance with certain features, the control unit is also configured to recognize a change in the sensor signal. For this purpose, for example, a value of the sensor signal, such as amplitude, frequency, phase and/or duration, is compared with a predefined reference value.

In accordance with certain other features, the control unit is also configured to alert the remote network component when a change in the sensor signal has been recognized.

Thus, the device according to exemplary embodiments evaluates sensor signals from a sensor on the housing of the device and alerts the remote network component in the event of a corresponding abnormality in the sensor signal. Then, the network component may immediately interrupt the forwarded data port as a countermeasure or move it to a quarantine zone in order to quickly counter a possible attack on the data port and thus, prevent tapping of data or information from the remote network component or the device. With this device, in particular a network node that is far away from a data center or a backbone, but has full access to the provided data port, is further secured by providing a sensor system that immediately alerts about a possible attack.

According to exemplary embodiments, the sensor generates a sensor signal as a function of light incident on the sensor, the change in the sensor signal being an abrupt or continuous increase in the sensor signal amplitude due to an increased incidence of light. Here, the sensor may be a light sensor, also referred to as a photo sensor or photo detector. With such a light sensor, the intensity of light with suitable wavelength can be measured. The sensor converts light into an electrical signal by means of a photoelectric effect or exhibits an electrical resistance that is dependent on the incident radiation. Since the device is arranged inside the pole, the inside of the pole is not accessible in normal operation, for example due to a locked pole door or pole lid, so that a defined, almost constant, low incidence of light is detected by the sensor in normal operation. When the pole is opened, for example by operating a pole door or pole lid, the incidence of light increases abruptly. The sensor detects this increase and alerts the remote network component.

According to exemplary embodiments, the evaluation of the sensor signal includes averaging the values of the sensor signal over a predefined period of time (so-called mini-hysteresis). In this way, short-term fluctuations in the physical property to be recorded can be averaged out. For example, a flash of light (thunderstorm, etc.) in the vicinity of the pole will not necessarily trigger the (false) alarming of the remote network components due to abnormally high incidence of light. For example, a gust of wind (storm, etc.) on the pole will not necessarily trigger the (false) alarming of the remote network components due to abnormal movement of the housing.

According to further exemplary embodiments, the sensor is a motion sensor, wherein a change in the sensor signal is an abrupt or continuous increase in the sensor signal amplitude due to movement of the housing of the device. The motion sensor is, for example, an acceleration sensor, an inclination sensor or a global positioning system, GPS, transmitter. In normal operation, the device is fixed in the stationary pole and is therefore not exposed to any movement. The movement sensor detects any movement of the housing, for example if an attacker tries to manipulate ports of the device or if a thief tries to steal the device. The remote network component is then alarmed.

According to further exemplary embodiments, the sensor is a switching element, wherein a change in the sensor signal is an abrupt or continuous increase in the sensor signal amplitude due the housing of the device being opened. The switching element is arranged in or on the housing in such a way that opening the housing causes a switching state to be changed. The switching element is, for example, a micro switch or a reed contact or a magnetic contact.

According to exemplary embodiments, the control unit is configured to delete and/or overwrite at least security-relevant information stored in a memory of the device when the change in the sensor signal is recognized by the control unit. Alternatively, the entire memory content of the device is deleted or overwritten. This further increases the security, since now when an abnormality is recognized, via the change in the sensor signal, the security-relevant information of the device is deleted. As a result, no data forwarded is forwarded and every peripheral loses the data connection to the remote network component. The energy supply to the peripherals is may also be disabled by the control unit, so that access to the data of the peripherals is no longer possible.

The confidential or security-relevant information relates, on the one hand, to configuration information of the device, in particular IP addresses for the remote network component, private cryptographic keys of the device, certificates of the device, signature keys of the device, a configuration file with connection parameter settings or, on the other hand, to access passwords, configuration passwords, blacklists of the device or another device, whitelists of the device or another device, access settings, and the like. User names and user passwords for authentication on the peripheral are also among the security-relevant information. The device is therefore completely unconfigured and can neither establish a data connection to the remote network component nor forward a data connection to/from a peripheral. Manipulation via data tapping or peripheral remote control is therefore excluded.

According to further exemplary embodiments, the control unit is configured to delete and/or overwrite the security-relevant information only when the change in the sensor signal results in an abrupt or continuous increase in the sensor signal amplitude due to the housing of the device being opened and/or due to the housing of the device being moved. Moving the device or opening the housing of the device is always evaluated as an attack and thus the deletion is forced. After opening the housing or moving the housing, the device is completely unconfigured and can thus neither establish a data connection to the remote network component nor forward a data connection to/from a peripheral. Manipulation via data tapping or peripheral remote control is therefore excluded.

According to exemplary embodiments, at least two sensors are provided. A redundancy of sensor signals may thus be used in order to more reliably detect an attack on the device. In addition, two-stage alarming may also be provided. For example, when a sensor amplitude of the first sensor exceeding a sensor signal threshold value is detected, initially (only) the remote network component is alerted, and when a sensor amplitude of the second sensor exceeding a sensor signal threshold value is detected, further measures are taken in the device itself, for example deleting or overwriting sensitive information.

According to exemplary embodiments, the device further comprises an energy storage for providing supply energy to the control unit when an energy supply external to the device is omitted or removed. The function of the sensor of the device is thus further ensured and, in addition, energy for deleting or overwriting the memory of the device is also guaranteed. Thus, even if the device is disconnected in the event of theft or maintenance, operability is enabled even without energy supply.

Deleting or overwriting is also referred to as "zeroizing".

According to further exemplary embodiments, the device comprises an energy supply unit. The energy supply unit includes a first energy port (for example the first data port or an additional port) for supplying supply energy external to the device. The energy supply includes at least a second energy port for diverting supply energy to the peripheral, the second energy port providing a Power-on-Ethernet, PoE, energy signal which is combined with the data signal to be transmitted between the device and peripheral. In this way, it is possible to supply each peripheral and also each functional unit of the pole via one of the second data ports of the device, reducing the amount of wiring in the pole and eliminating the need to provide an additional energy supply for the peripherals. The energy supply may be an energy supply unit, the energy consumption of which is monitored and logged. In this way, abnormalities in the device itself or in the peripherals can be detected and reported to the remote network component.

According to further exemplary embodiments, the energy supply unit includes at least one third energy port for diverting supply energy for the control unit. The energy for the control unit is thus conditioned by the device itself and does not have to be provided externally.

According to further exemplary embodiments, the control unit is arranged on a printed circuit board with a standard form factor, such as PC/104, with the energy supply unit being arranged on a second printed circuit board with a standard form factor, such as PC/104. This industry standard allows for the device to be miniaturized such that it can be arranged in the pole without having to make structural changes to the pole. In addition, this form factor is suitable for providing a large surface for components of the device such that good heat dissipation can be achieved. Choosing the same form factor also allows for multiple boards to be arranged one above the other, so-called "stacking", and to be connected using plug-in connectors. This improves the electromagnetic compatibility of the components with one another.

According to exemplary embodiments, the authentication of the peripheral for forwarding the data communication between the remote network component and the peripheral is performed based on the MAC address of the peripheral, wherein in the event of a failed authentication of the peripheral, the forwarding of the data communication is prevented by the control unit. In accordance with certain features, the data communication complies with the IEEE 802.1x protocol and enables secure communication. The MAC address of the peripheral may be advertised in the remote network component. This safeguard means that a peripheral installed on the device is not exchangeable, wherein another peripheral at the second data port leads to a deactivation of the data connection to the peripheral.

Other embodiments include a method for putting the device described herein into operation using the following method steps: transmitting a data signal via at least one first data port of the device for receiving configuration information from a remote network component, the device being known to the remote network component; receiving the configuration information from the remote network component in the device, wherein the receiving may be performed using the Trivial File Transfer Protocol, TFTP, for initializing the device; and establishing a data connection between the device and the remote network component using the configuration information. The configuration file is may be transmitted as cryptographically encrypted, with a corresponding key being negotiable between the remote network component and the device, for example using a Diffie-Hellmann method or other derived session keys.

Additional embodiments include a method for operating a peripheral on a device described herein, the following method steps being performed after the device has been put into operation as described here: connecting a data signal to at least one second data port of the device for connecting the device to a peripheral, the peripheral being advertised to the remote network component prior to connecting; checking, by the device, that the MAC address of the peripheral matches a MAC address transmitted by the remote network component; and forwarding a data connection of the remote network component to the peripheral if the MAC address of the peripheral matches the transmitted MAC address.

According to further embodiments, there is provided a computer program product that is installed in an executable manner in a control unit of the device described herein and comprises means for executing the method steps described herein.

BRIEF DESCRIPTION OF THE DRAWINGS

Exemplary embodiments and advantages are explained in more detail below with reference to figures, the figures merely describing the exemplary embodiments. The same components in the figures are designated with the same reference symbols. With specially marked exceptions, the figures are not to be regarded as true to scale; individual elements of the figures may be shown exaggeratedly large or exaggeratedly simplified.

DETAILED DESCRIPTION

Figure 1:
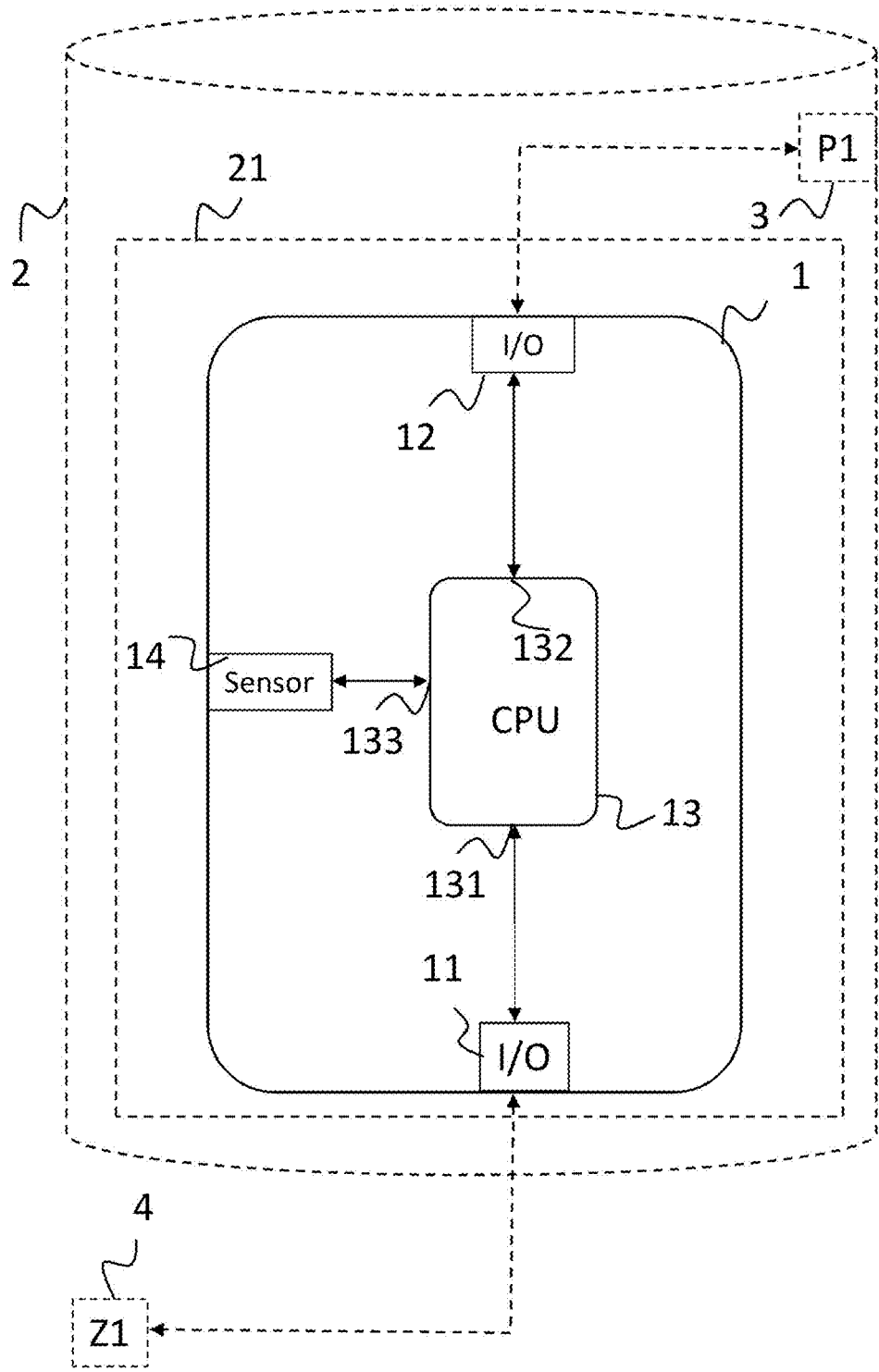
FIG. 1 shows a simplified block diagram of a device within a schematically illustrated pole portion, according to an exemplary embodiment.

FIG. 1 shows a simplified block diagram of an exemplary embodiment of a device within a schematically illustrated pole portion of a pole 2. With this exemplary embodiment, it is possible to upgrade poles 2 of cities, municipalities and companies to communication and control nodes and thus to enable a smart city concept.

Here, the pole 2 is a light pole, as will be explained in greater detail in the following FIGS. 8 to 10, for example. The pole is hollow on the inside and has a pole opening 21 that can be closed in a substantially light-tight manner by a lid or door (not shown). In the interior of the pole 2, there is an exemplary embodiment of the device 1, hereinafter referred to simply as switch 1, that is a network switch.

According to this particular embodiment, the switch 1 is integrated in a metal housing with protection class IP67. The switch 1 provides at least a first port 11 on the input side, the port being connected to a first data port 131 of a control unit 13 in the switch 1. The first data port 131 is configured to transmit a data signal between the switch 1 and a network component, hereinafter referred to simply as the data center 4 or backbone 4, remote from the pole 2. The data signal at the first connection 11 has a bit rate of 10 Gbit, for example, but could also have only 1 Gbit or 100 Gbit. The data center is, for example, a city or state data center that is sometimes several hundred kilometers away from pole 2. The network is a Metropolitan Area Network, or MAN for short. The data signal may be connected to the first port 11 via optical waveguide. The data signal may be transmitted by a monomode method when the distance between device 1 and the remote network component 4 exceeds a certain threshold value. The data signal may be transmitted by a multi-mode method if the distance between device 1 and the remote network component 4 falls below a certain threshold value.

On the output side, the switch 1 includes at least one second port 12 connected to a second data port 132 of the control unit 13 in the switch 1. The second data port 132 is configured to transmit a data signal between the switch 1 and a peripheral 3. The data signal at the second port 12 is, for example, a 1 Gbit Ethernet interface. This data signal may have a Power-On-Ethernet, PoE, functionality via which a predefined maximum power, for example 25 W, can be supplied to the peripheral 3. The data signal is may be connected to the second port 12 via copper.

The switch 2 has a sensor 14 built into the housing. In the particular embodiment depicted in FIG. 1, this sensor 14 is a light sensor connected to a sensor signal port 133 at the control unit 13. The light sensor is installed at the housing of the switch 1 from the inside in order to detect light incident in the pole opening 21. A partial region of the housing of the switch 1 is thus transparent to the incident light so that the sensor 14 located behind the region in the housing can detect the incident light. Alternatively, the housing is provided with a through-hole in which the sensor 14 is disposed in order to be able to detect the incident light. Alternatively, the sensor 14 may also be placed outside on the housing of the switch 1.

In normal operation, the pole opening is closed so that a constant very low incidence of light is detected inside the pole. A pole door could also close the pole opening 21 of the pole 2 in a substantially light-tight manner. If the pole opening 21 is opened, for example the pole door or pole lid (not shown) is unlatched or unlocked, i.e. actuated, significantly more light enters into the interior of the pole 2 (even at night). The sensor 14 senses the higher incidence of light and generates an increase (for example abruptly or continuously) of the sensor signal amplitude over a certain period of time. The sensor signal is evaluated in the control unit 13 and this increase is recognized. The control unit 13 assesses this as a deviation from normal operation and informs (alarms) the backbone 4 accordingly. The alarm to the remote network component 4 could be issued when the light sensor 14 detects a predefined illuminance that is, for example, greater than 10 lux or greater than 7 lux. In the control unit 13, a trigger delay or an averaging of the sensor values (also referred to as mini-hysteresis) is provided for a specific period of time. This means that light fluctuations in the range of, for example, a few 100 ms are not to be assessed as an alarm. This means that no false alarms are triggered in the event of, for example, a thunderstorm.

Alarming the backbone 4 may comprise communicating an ID of the switch 1 or a location of the pole 2 or both with a corresponding error code (e.g., incidence of light detected). The backbone 4 decides on suitable measures. It could classify the incident as normal if maintenance on the pole 2 in the backbone 4 is known. It could evaluate the incident as an attack and move the existing data connection between the peripheral 3 and the backbone 4 to a quarantine region and thus continue to monitor the incident in a secure environment. Alternatively, it could cut off the data connection to the switch 1 or cause the switch to interrupt the data connection between the backbone 4 and the peripheral 3. It could order the deletion of the memory area in the control unit 13.

In any case, the switch 1 is better secured and in particular the sensitive data (IP addresses, private keys, signature keys, configuration data, passwords) of the switch 1 are better secured. A pole 2 installed in a forlorn area with a switch 1 arranged therein having a direct connection to the backbone 4 is thus better protected against attacks.

The sensor 14 used in the exemplary embodiment of FIG. 1 may alternatively, or additionally also, be a motion sensor or a micro switch. These types of sensors detect a movement of the housing or the opening of the housing of the switch 1. These measures are directly assessed to be an attack by the control unit and trigger an immediate deletion of the above-mentioned sensitive data in the memory of the switch. The switch is then no longer configured and may neither establish nor forward a data connection to a backbone 4 or to a peripheral 3. Thus, the removal of the switch 1 or the opening of the switch 1 does not result in unauthorized manipulation of the data connection, and this effectively prevents sensitive data to be read out or information to be tapped by the attacker.

Figure 2:
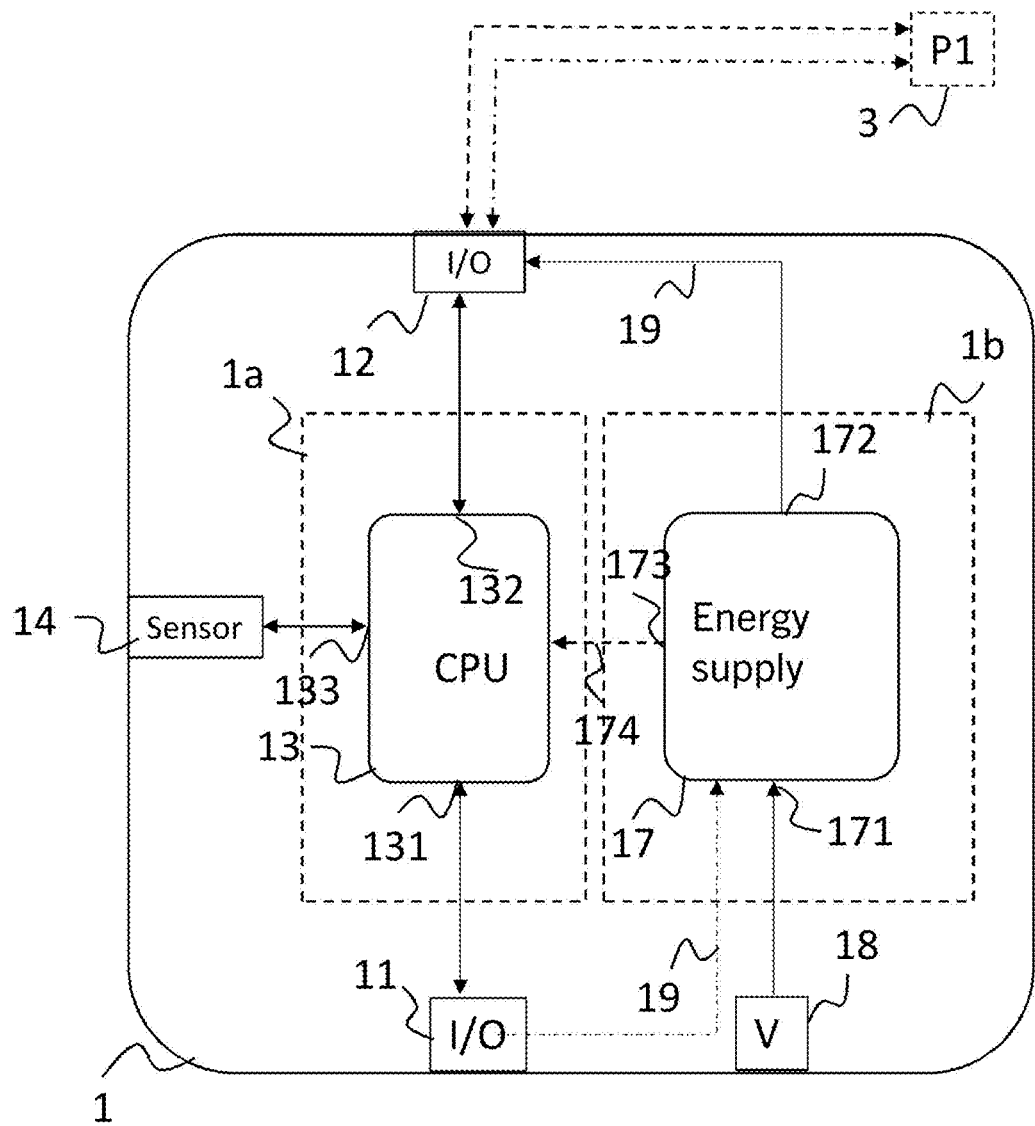
FIG. 2 shows a simplified block diagram of a device according to an exemplary embodiment.

FIG. 2 shows a simplified block diagram of another exemplary embodiment of device 1. The device 1 in FIG. 2 corresponds to the device 1 in FIG. 1 and only includes further elements to which reference is made below. The components already presented in FIG. 1 are not repeated here.

The device 1, hereinafter referred to as switch 1, includes a first board 1a comprising the control unit 13. The board 1a is described in more detail in FIG. 4. In addition, the switch 1 includes a second board 1b comprising an energy supply unit 17. The board 1b is described in more detail in FIG. 5. Both of the boards 1a, 1b are connected to one another via a connector 174 and are implemented together in the metal housing of the switch 1. Both of the boards 1a, 1b may be standard form factor boards, such as having the form factor PC/104. This form factor PC/104 allows for scaled-down construction of the switch 1 and, thanks to this scaled-down construction, the integration of the switch 1 into a pole 2 with a very small diameter in a simplified manner is possible. Both of the boards 1a, 1b may each have a form factor different from the form factor PC/104. The form factor also allows for several boards to be arranged on top of one another, so-called "stacking", and to be connected using plug-in connectors 174. This improves the electromagnetic compatibility of the components with one another.

The switch 1 includes, for example, a third port 18 to which an energy supply is applied. This third port 18 is led to a port 171 of the energy supply unit 17. Alternatively, as shown here as a dash-dot line, an energy supply via the first port 11, for example as a PoE signal, is provided. In this case, the third port 18 may be omitted and the structure is simplified.

The energy supply unit 17 provides an energy supply for the peripheral 3 via an energy output 172. This energy supply is switched as a PoE signal 19 to the second port 12 of the switch 1 and thus provided to the peripheral 3 via a port along with the data signal of the second data port 132 of the control unit 13. The use of the PoE signals 19 simplifies the wiring work in the pole 2 considerably and the peripherals 3 can be supplied with energy by the switch 1. Further external energy source(s) for supplying the peripherals 3 may thus be omitted.

The energy supply unit 17 also provides an energy supply for the control unit 13 via an energy output 173. This energy supply is made possible, for example, via a connector 174. Further external energy source(s) for supplying the control unit 13 may thus be omitted.

Figure 3:
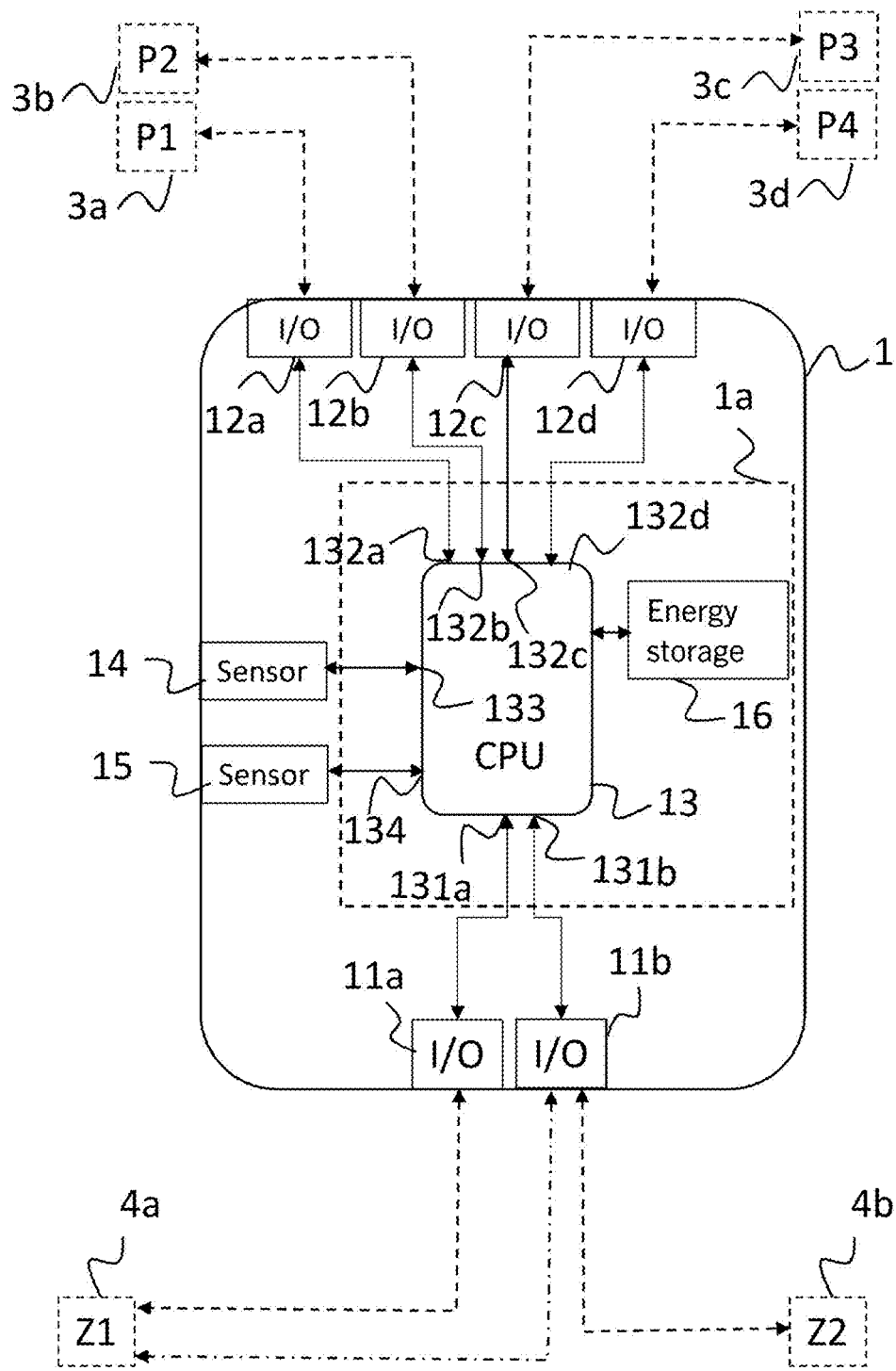
FIG. 3 shows a simplified block diagram of a device according an exemplary embodiment.

FIG. 3 shows a simplified block diagram of a further exemplary embodiment of device 1. The device 1 of FIG. 3 corresponds to the device 1 of FIG. 1 and the first board 1a of FIG. 2 and includes further elements to which reference is made below. The components already presented in FIG. 1 and FIG. 2 are not repeated here.

In contrast to FIG. 1 or FIG. 2, two first ports 11a, 11b are now provided on switch 1 as depicted in FIG. 3. A first backbone 4a is connected to the first port 11a. A second backbone 4b is connected to the second port 11b. This may increase the bandwidth of the switch 1 and consequently could lead to an improved functionality of the peripherals 3a to 3d. Alternatively—as shown in FIG. 3 as a dash-dot line—a first backbone 4a is connected to the second port 11b. This may increase the bandwidth of the switch 1 and could consequently lead to an improved functionality of the peripherals 3a to 3d. For example, two 10 Gbit SFP modules may be used as ports 11a, 11b. The two first ports 11a, 11b are each connected to first data ports 131a, 131b of the control unit 13, respectively.

In a further difference to the exemplary embodiments depicted in FIG. 1 or FIG. 2, four second ports 12a, 12b, 12c, 12d are now provided on the switch 1 as depicted in FIG. 3. A first peripheral 3a is, or can be, connected to the second port 12a. A second peripheral 3b is, or can be, connected to the second port 12b. A third peripheral 3c is, or can be, connected to the second port 12c. A fourth peripheral 3d is, or can be, connected to the second port 12d. The four second ports 12a, 12b, 12c, 12d are each connected to second data connections 132a, 132b, 132c, 132d of the control unit 13, respectively. Thus, according to this specific configuration, up to four peripherals 3 can be connected to a switch 1 at the same time. However, the number of peripherals 3 that can be connected is not restrictive. For example, according to certain exemplary embodiments, up to 24 peripherals 3 can be connected to a switch 1. For example, each peripheral 3 is provided with a 1 Gbit connection as ports 12a, 12b, 12c, 12d.

In a further difference to the exemplary embodiments depicted in FIG. 1 or FIG. 2, at least two sensors 14, 15 are now provided in switch 1 as depicted in FIG. 3. The first sensor 14 is the light sensor already described in FIG. 1, the sensor signal of which is connected to the sensor signal port 133 of the control unit 13. The second sensor 15 is the micro switch already indicated in the description of FIG. 1, the sensor signal (or switching signal) of which is connected to a second sensor signal port 134 of the control unit 13. By using two sensors 14, 15 and corresponding evaluation of the sensor signals at the ports 133, 134 of the control unit 13, a two-stage alarm or protection method may be used. Accordingly, if an increased incidence of light is recognized by the light sensor 14(=first stage of the attack), only the backbones 4a, 4b could be alarmed and the measures already described in FIG. 1 could be taken. If the switching element 15 recognizes that the housing has been opened(=second stage of the attack), the deletion/overwriting of the sensitive data from the memory of the switch 1 could be initiated. Thus, the operability of the network is maintained for as long as possible and opening the pole 2 does not automatically have to result in an interruption of the data connection. Thus, unannounced maintenance activities may also be observed, and the functionality of the network is retained. However, if the second stage of an attack is detected, the sensitive data can be reliably deleted.

In a further difference to the exemplary embodiments depicted in FIG. 1 or FIG. 2, an energy storage 16 is now provided as depicted in FIG. 3. This energy storage 17, for example a storage capacitor with several 100 millifarads to several farads, ensures the operation of the switch 1 even in the event of brief power supply fluctuations and allows for an attack to be detected even with removed energy supply. In this way, the sensitive data can be reliably deleted, even if the energy supply has already been switched off.

Figure 4:
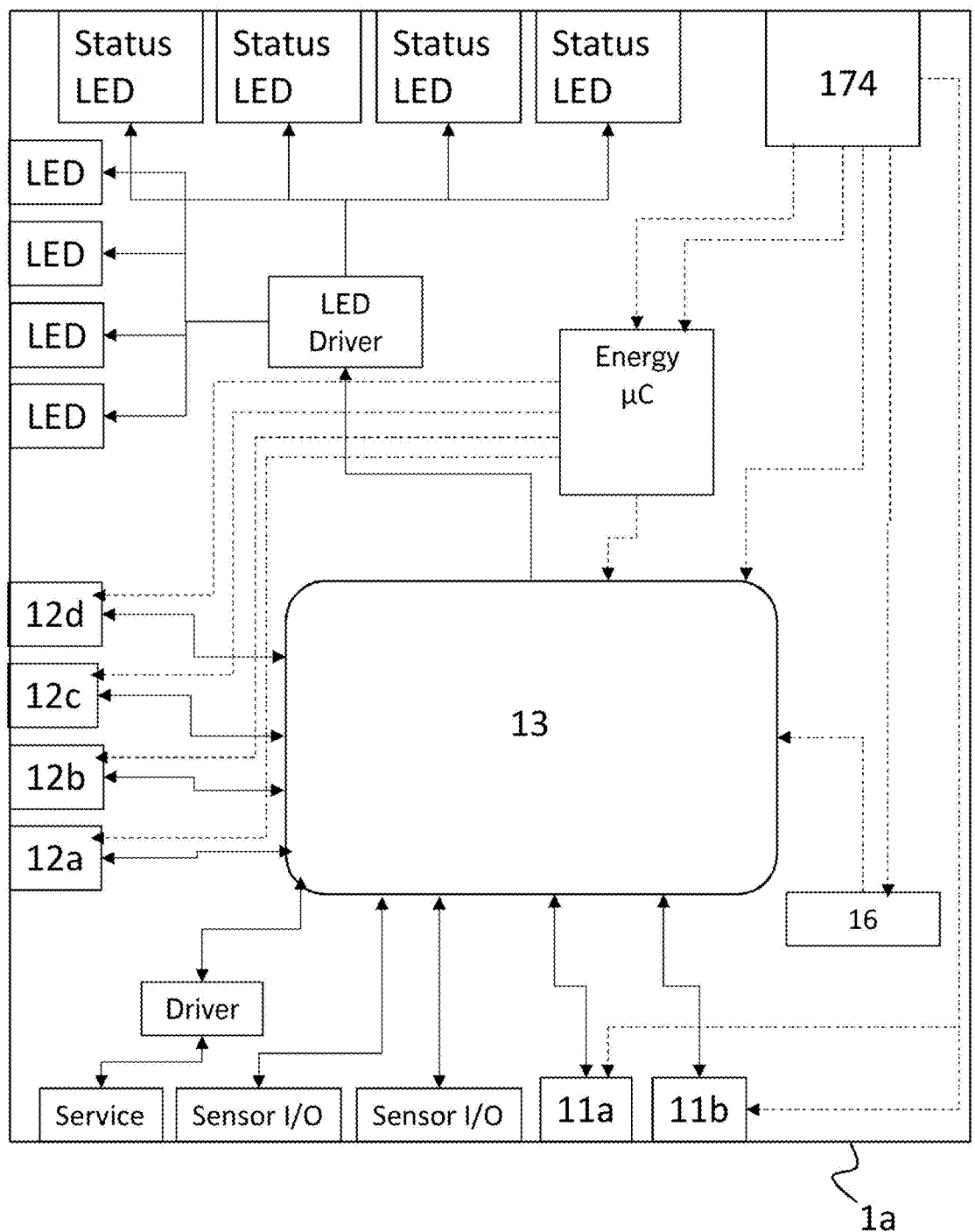
FIG. 4 shows a block diagram of a device according to an exemplary embodiment.

FIG. 4 shows a block diagram of an exemplary embodiment of a first board 1a of a device 1. The device 1 in FIG. 4 corresponds to the device 1 depicted in FIG. 3 and includes further elements to which reference is made below. The components already presented in FIGS. 1 to 3 are only indicated here. In FIG. 4, a block diagram of the components on the first board 1a of the switch 1, a so-called "carrier board", is shown.

In this particular embodiment, the first board 1a is connected to a second board 1b (see FIG. 5) via a plug-in connector 174 and receives three different voltages, namely 50 V, 5 V and 3.3 V, via the plug-in connector from the second board 1b. An energy μC uses the supplied voltages to provide a supply voltage for the control unit 13 and PoE signals for the four second ports 12a, 12b, 12c, 12d. The ports 11a, 11b are also supplied with energy. The two sensors are not accommodated on the board 1a, but are arranged in suitable places on the housing and connected to the control unit 13 by wire, i.e., via a "Sensor I/O" plug-in connector. As already shown in FIG. 3, the control unit 13 is connected to two first ports 11a, 11b and four second ports 12a, 12b, 12c, 12d.

In addition, status LEDs may be provided which visualize the state of the switch 1 to the outside (outside the housing of the switch 1). For example, a status LED may indicate whether there is an energy supply, a status LED may indicate whether the switch is turned on, a status LED may be two-colored and indicate whether there is a data connection with the backbone 4a, and a status LED may be two-colored and indicate whether there is a data connection with the backbone 4a or 4b (depending on how it was wired). In addition, LEDs may be provided which indicate the connection status with the respective peripherals 3a, 3b, 3c, 3d. These LEDs may be arranged such that they can be seen from the outside via bores on the housing or transparent portions in the housing.

Further, the board 1a may have a service port via which the control unit 13 can be updated and maintained by means of a driver module.

Figure 5:
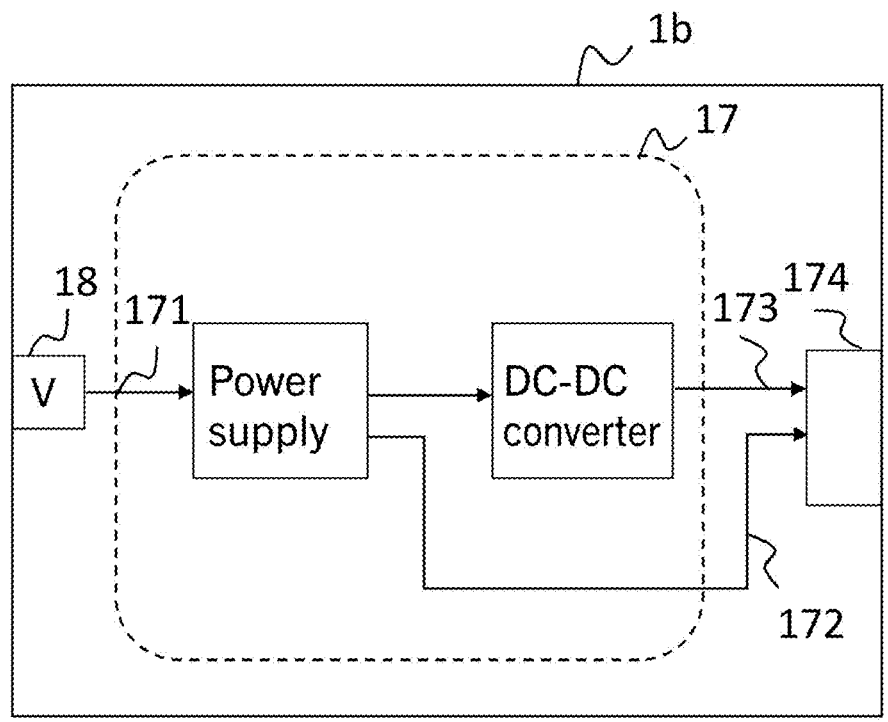
FIG. 5 shows a block diagram of an energy supply unit of a device according to an exemplary embodiment.

FIG. 5 shows a block diagram of an exemplary embodiment of a second board 1b of a device 1. The board 1b of FIG. 5 corresponds to the indicated board 1b of the embodiment depicted in FIG. 2 and includes further elements to which reference is made below. The components already presented in FIGS. 1 to 3 are not repeated here. In FIG. 5, a block diagram of the components on the second board 1b of the switch 1, a so-called "power board", are shown.

The second board 1b includes, for example, a third port 18 to which an energy supply, for example 110 VAC to 230 VAC at 50 Hz or 60 Hz, can be applied. This third port 18 is led to a port 171 of the energy supply unit 17.

According to this particular embodiment, the energy supply unit 17 provides an energy supply for the peripheral 3 via an energy output 172. A power supply with, for example, a wide range input with an output voltage of 50 V and 3 A, may be implemented for this purpose. By mounting the power supply module directly on the metal housing, the waste heat from the power supply may be dissipated. The housing of the switch 1 is thus also a heat sink for the power supply. For example, the cooling capacity of the housing of the switch may be at least 1 K/W. As a result, there is no need for additional fans or heat pipes. This energy supply is applied, for example, as a PoE signal 19 via the plug-in connector 174 to the second port 12 of the switch 1 and is thus provided to the peripheral 3 via a connection together with the data signal from the second data port 132 of the control unit 13.

The energy supply unit 17 may also provide an energy supply for the control unit 13 via an energy output 173. For this purpose, a DC-DC switching converter with an output voltage of 5 V and 6 A may be implemented, which is supplied by the power supply described above. The energy supplies are forwarded to the first board 1a, for example via the connector 174. As a result, further external energy source(s) for supplying the control unit 13 or the peripherals 3 may thus be omitted.

Figure 6:
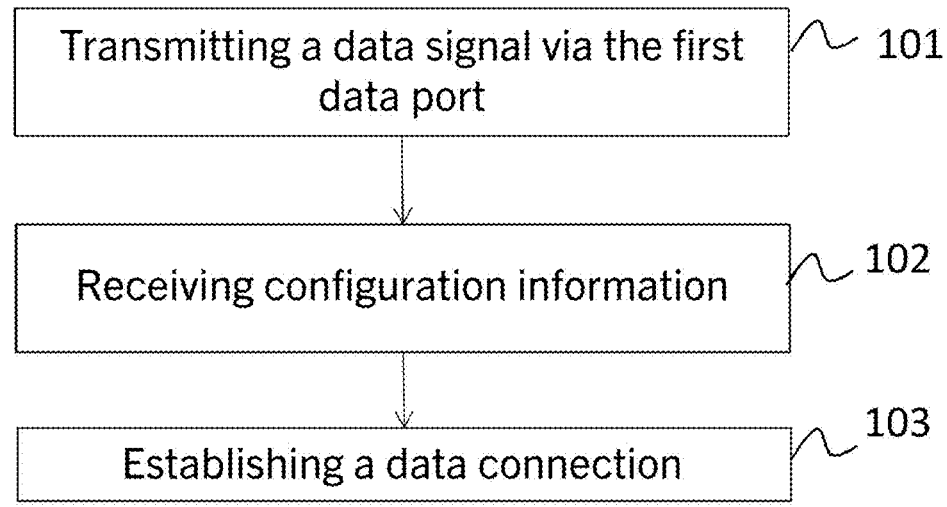
FIG. 6 shows a flow chart of a method according to an exemplary embodiment.

FIG. 6 shows a flowchart of an exemplary embodiment of a method 100 for putting a device 1 of the type described above into operation. In a first step 103, a data signal is transmitted via at least one first data port 11 of the device 1 for receiving configuration information from a remote network component 4, the device 1 being known to the remote network component 4. For this purpose, for example, an ID of the device 1 was stored in the backbone 4. If the device 1 is known in the backbone, the backbone 4 sends configuration information. In the device 1, the configuration information is received in step 102, by means of, for example, the Trivial File Transfer Protocol, TFTP, for initializing the device 1. In step 103, a data connection is established between the device 1 and the remote network component 4 using the configuration information. This configuration information is, for example, IP addresses, SSH keys, policy settings and, if applicable, black/white lists of devices 1.

Figure 7:
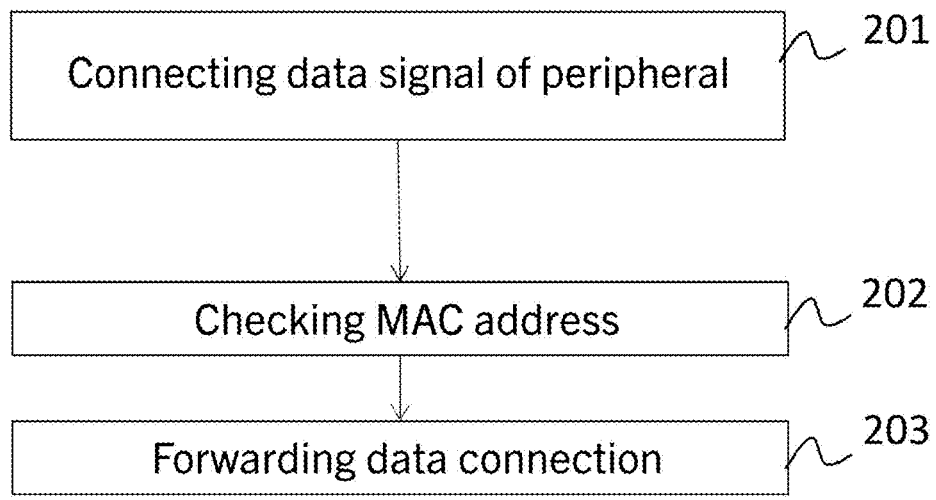
FIG. 7 shows a flow chart of a method according to a further exemplary embodiment.

FIG. 7 shows a flowchart of another exemplary embodiment of a method 200 for operating a peripheral 3 on a device 1 described above. The device 1 was put into operation according to the exemplary method of FIG. 6. Here, in step 201 of FIG. 7, a data signal is connected to at least one second data port 12 of the device 1 for connecting the device 1 to a peripheral 3, the peripheral 3 having been advertised to the remote network component 4 prior to connection. The advertising is performed, for example, by reading out a QR code of the peripheral 3, by means of which a MAC address of the peripheral 3 is communicated to the backbone 4. In step 202, the match of the MAC address of the peripheral 3 with a MAC address communicated by the remote network component 4 is checked by the device 1. In step 203, a data connection of the remote network component 4 is forwarded to the peripheral 3 if the MAC address of the peripheral 3 matches the communicated MAC address.

Figure 8:
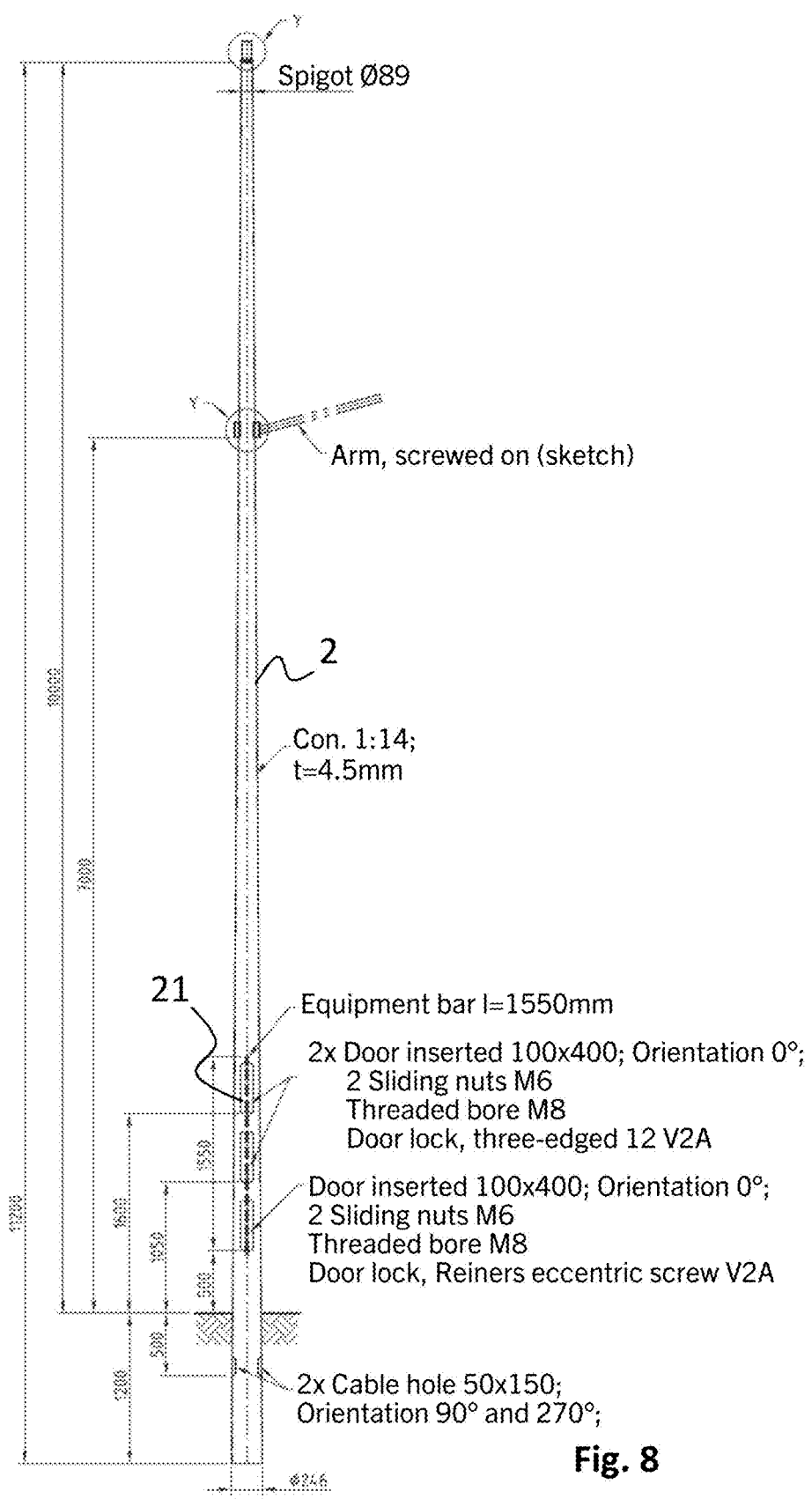
FIG. 8 shows a true-to-scale exemplary embodiment of an exemplary pole in which a device, according to an exemplary embodiment thereof, is arranged.

FIG. 8 shows a true-to-scale exemplary embodiment of an exemplary pole 2 in which a device 1, according to an exemplary embodiment thereof, is arranged. In this particular embodiment, the pole has three pole openings 21 arranged one above the other, each of which can be locked by means of a triangular door lock. Each pole opening 21 can be closed with a pole door measuring, for example, 100×400 millimeters. The housing of the device must be insertable into the interior of the pole 2 through this pole door size, so that the external dimensions of the housing are limited to these pole opening sizes. The diameter of pole 2 at the base of the pole is, for example. 246 millimeters. An equipment bar extends inside the pole and, for example, is designed as a top hat rail or as a rail. The housing of the device is arranged on this equipment bar.

Figure 9:
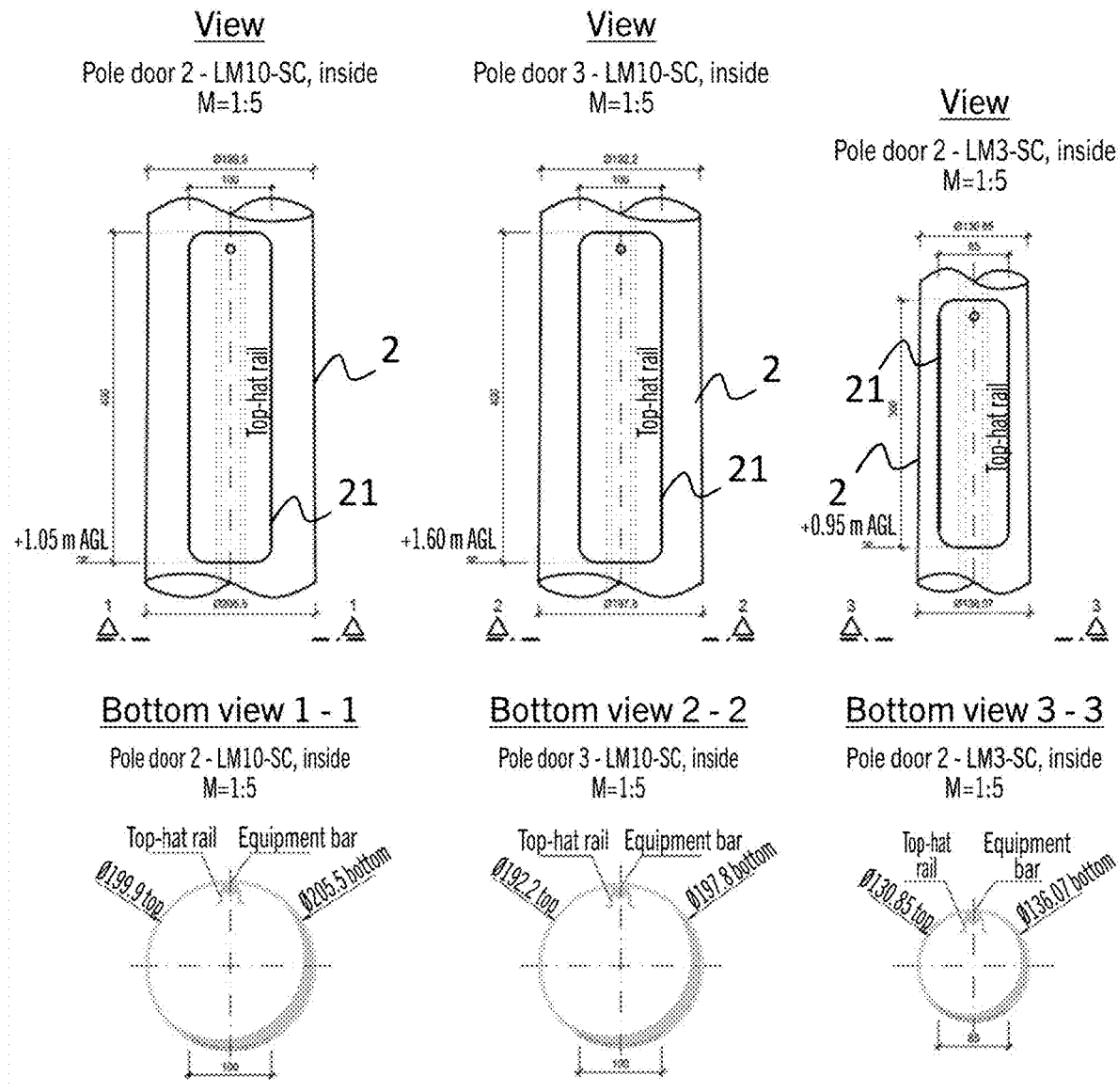
FIG. 9 shows three true-to-scale exemplary embodiments of exemplary pole openings through which a device, according to an exemplary embodiment thereof, is arranged in a pole.

FIG. 9 shows three true-to-scale exemplary embodiments for exemplary pole openings 21 in poles 2, through which a device 1, according to an exemplary embodiment thereof, is arranged in a pole 2. It is intended to provide only one housing for the device 1, so that the dimensions of the smallest pole opening 21, such as those of the pole type LM3-SC, limit the external dimensions of the housing of the device. With the pole type LM3-SC as an example, the diameter on the level of the pole opening 21 is between 130.85 and 136.07 millimeters and the pole opening 21 has dimensions of 85 by 300 millimeters.

Figure 10:
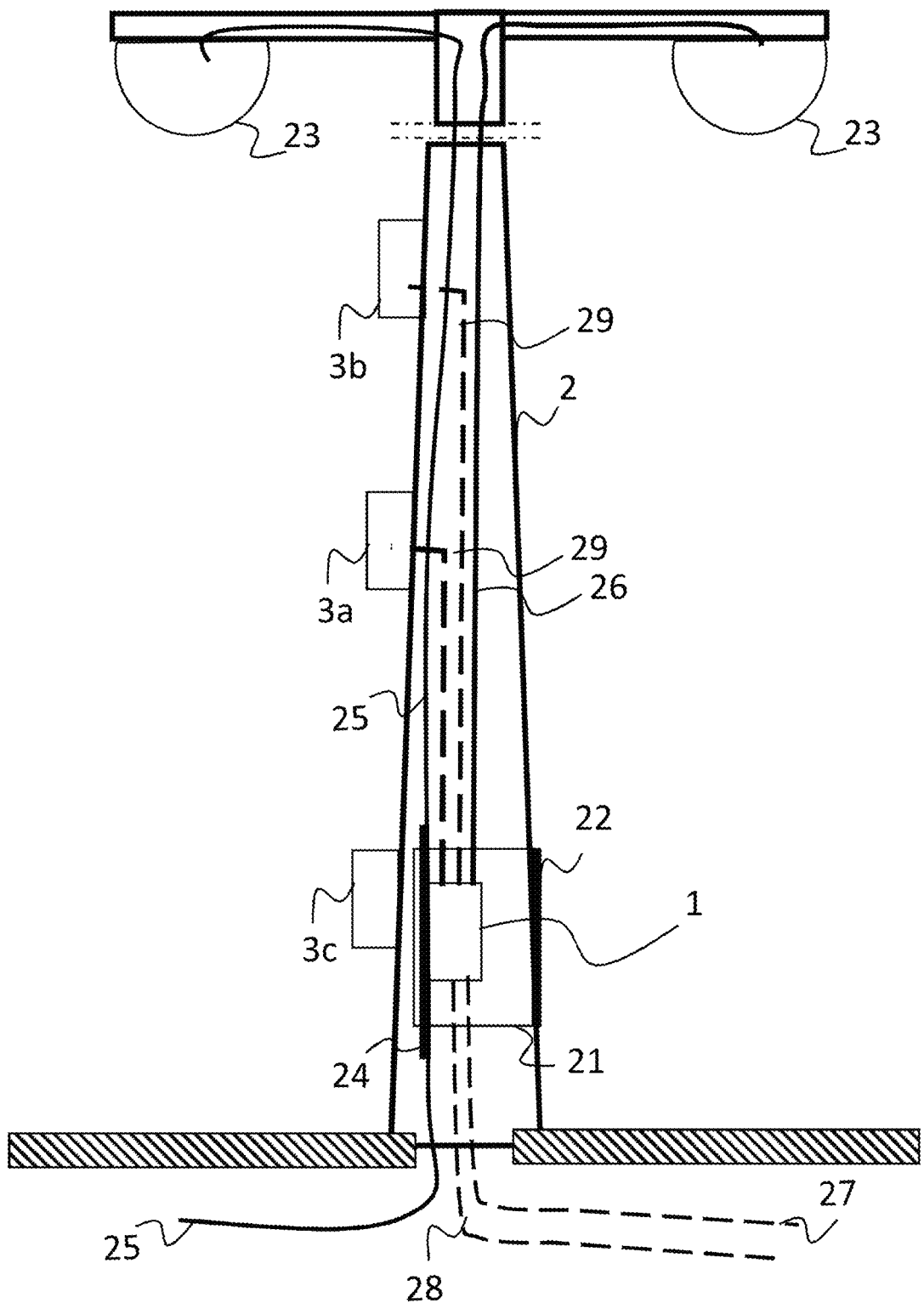
FIG. 10 shows a system comprising a pole with a device arranged therein according to an exemplary embodiment.

FIG. 10 shows an exemplary embodiment of a system having a pole 2 with a device 1 arranged therein. The pole 2 may be of the type of pole shown in FIG. 8 or 9. The device 1 may correspond to one of the devices of the type in FIGS. 1 to 7. In this particular embodiment, the device 1 is inserted through the pole opening 21 into the interior of the pole 2 and is mechanically fastened there to a top-hat rail 24, for example by means of a claw, clamp and/or screw connection. Alternatively, in a well-secured environment, a magnetic connection may also be used to fasten the device 1 inside the pole 2.

According to the embodiment of FIG. 10, the pole 2 has two lighting sources 23 as a functional unit. These lighting sources 23, for example LED lighting, are connected either to their own energy supply 25 or to a PoE supply 26 of the device 1 and are accordingly supplied with power thereby.

Further, a peripheral 3b, for example a traffic sensor, is attached to the pole 2 and is connected to a backbone by means of a data connection 29 via the device 1 (see the indicated data connection 27 to the backbone).

In addition, a peripheral 3a, for example a camera or a WLAN-AP, is attached to the pole 2 and connected to a backbone by means of a data connection 29 via the device 1 (see the indicated data connection 27 to the backbone).

Additionally, a peripheral 3c, for example an electric vehicle charging station, is attached to the pole 2 and is connected to a backbone by means of a data connection 29 via the device 1 (see the indicated data connection 27 to the backbone).

Figure 11:
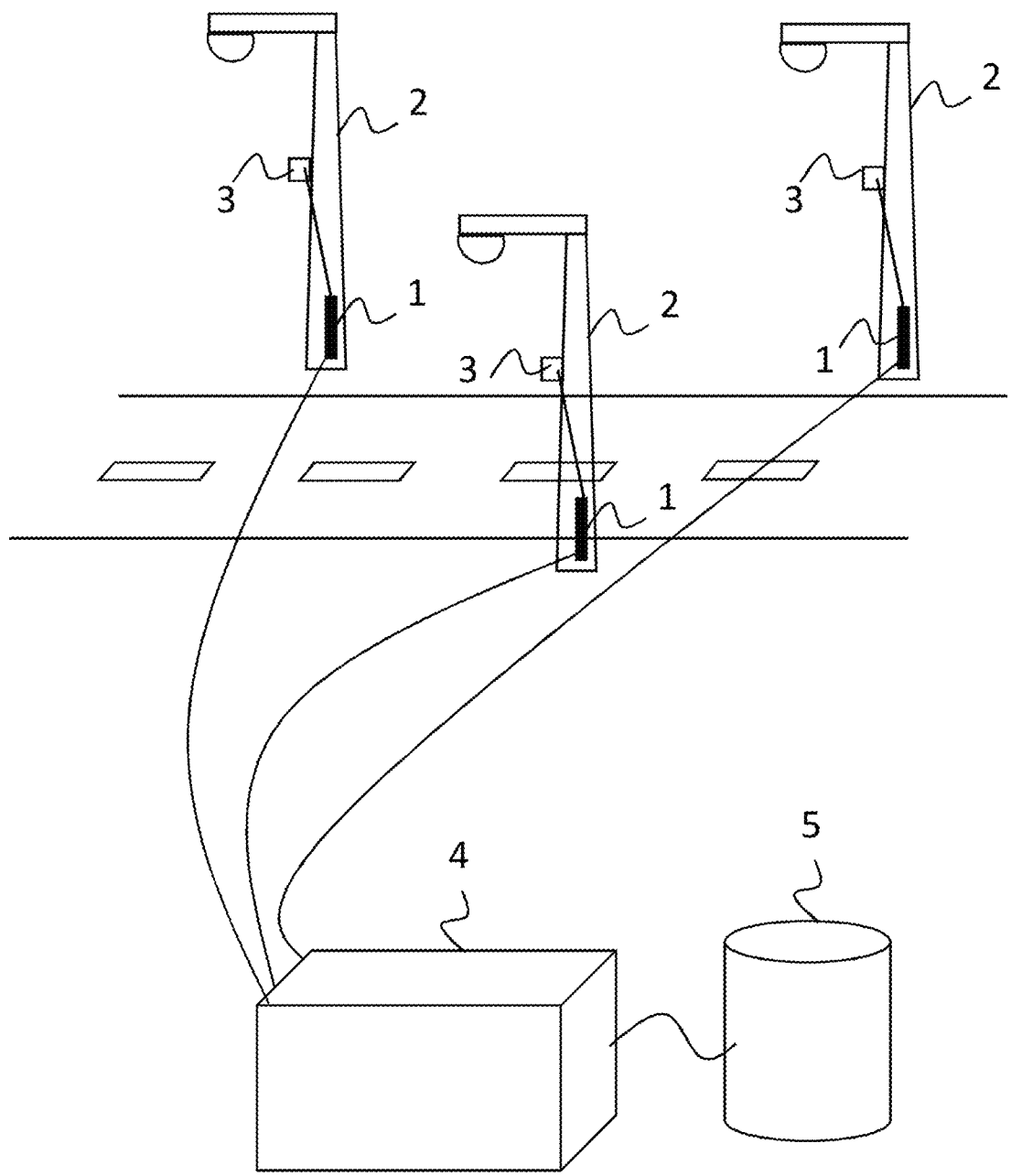
FIG. 11 shows a system having three poles in a traffic monitoring system configured in a star topology according to an exemplary embodiment.

FIG. 11 shows an exemplary embodiment of a system having three poles 2, each with a device 1 pertaining to traffic monitoring, interconnected in a star-bus topology. Here, the poles 2 are provided as lighting elements for the street and are each equipped with a device 1. Each pole 2 also has a traffic sensor as a peripheral 3. The data from the traffic sensors is forwarded to the data center 4 via the device 1. The data center 4 is in turn connected to a server 5 allowing road users to receive the data recorded by the traffic sensors or the information resulting therefrom, for example via suitable interfaces in a means of transport (navigation device) or a user terminal (smartphone), and to correspondingly adjust a travel path.

Figure 12:
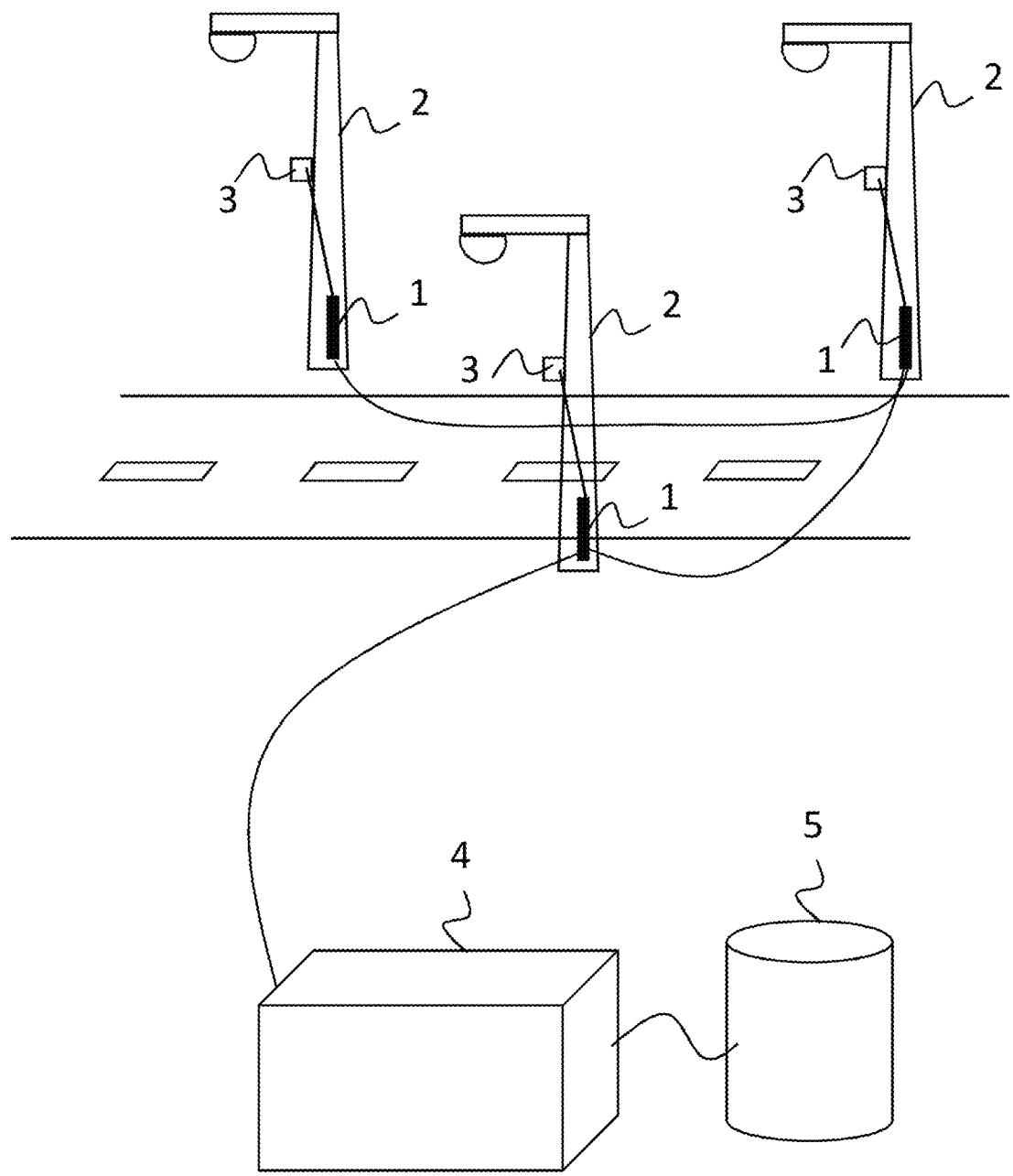
FIG. 12 shows a system having three poles in a traffic monitoring system configured in a daisy chain topology according to an exemplary embodiment.

FIG. 12 shows an exemplary embodiment of a system having three poles 2, each with a device 1 pertaining to traffic monitoring, interconnected in a daisy chain topology. In this case, the pole 2 assigned closest to the remote network component 4 is connected to a remote network component 4. The remaining poles 2 are each connected to one another in series. Then, the signal to and from a device 1 in the pole 2 passes through its predecessor device(s) to the remote network component 4. In case of this interconnection of the devices 1, it is important that priorities can be assigned. It can thus be established that information can only be transmitted, for example, when the line is free, or that some devices 1 have unconditional priority over others. This can prevent conflicts and malfunctions.

Within the scope of the invention, all elements described and/or drawn and/or claimed can be combined with one another as desired.

What is claimed is:

1. A device having an active network component and operably arranged within a pole by means of a housing of said device, said device comprising:
    a sensor on said housing of said device and configured to provide a sensor signal; and
    a control unit in an interior of said device, comprising:
        at least one first data port configured to transmit a data signal between said device and a network component remote from said pole;
        at least one second data port configured to transmit a data signal between said device and a peripheral; and
        a sensor signal port for receiving said sensor signal;
    wherein said control unit is configured to forward data communication between said remote network component and said peripheral; and
    wherein said control unit is configured to:
        evaluate the received sensor signal;
        detect a change in the sensor signal; and
        alert said remote network component when the change in the sensor signal is recognized by said control unit.

2. The device according to claim 1, wherein said sensor generates the sensor signal as a function of light incident on said sensor, the change in the sensor signal being an increase in a sensor signal amplitude due to an increased incidence of light.

3. The device according to claim 1, wherein evaluating the sensor signal comprises averaging values of the sensor signal over a predefined period of time.

4. The device according to claim 1, wherein said sensor is a motion sensor, the change in the sensor signal being an increase in a sensor signal amplitude due to said housing of said device being moved.

5. The device according to claim 1, wherein said sensor is a switching element, the change in the sensor signal being an increase in a sensor signal amplitude due to said housing of said device being opened.

6. The device according to claim 1, wherein said control unit is configured to delete and/or overwrite at least security-relevant information stored in a memory of said device when the change in the sensor signal is recognized by said control unit.

7. The device according to claim 6, wherein said control unit is configured to delete and/or overwrite at least the security-relevant information only when the change in the sensor signal results in an increase in a sensor signal amplitude due to said housing of said device being opened and/or due to said housing of said device being moved.

8. The device according to claim 1, further comprising an energy storage for temporarily providing supply energy for said control unit in the event of failure or removal of an energy supply external to said device.

9. The device according to claim 1, wherein:
    said at least one first data port is connected to a first port of said device; and
    said at least one first data port includes at least two first data ports each configured to transmit a data signal between said device and at least said network component remote from said pole, wherein each first data port is connected to said first port of said device.

10. The device according to claim 1, wherein:
    said at least one second data port is connected to a second port of said device; and
    said at least one second data port includes at least four second data ports each configured to transmit a data signal between said device and said peripheral, wherein each second data port is connected to said second port of said device.

11. The device according to claim 1, wherein said device comprises an energy supply unit, said energy supply unit comprising:
    a first energy port for providing a supply energy external to said device;
    at least one second energy port for diverting a supply energy for said peripheral, said second energy port providing a Power-on-Ethernet (PoE) energy signal combined with the data signal to be transmitted between said device and said peripheral.

12. The device according to claim 11, wherein said energy supply unit includes at least one third energy port for diverting supply energy for said control unit.

13. The device according to claim 11, wherein:
    said control unit is arranged on a printed circuit board with a standard form factor of PC/104; and said energy supply unit is preferably arranged on a second printed circuit board with a standard form factor of PC/104.

14. The device according to claim 1, wherein an authentication of said peripheral for forwarding the data communication between said remote network component and said peripheral is performed on the basis of a media access control (MAC) address of said peripheral, with the forwarding of the data communication from said control unit being prevented if the authentication of said peripheral fails.

15. A method of operating the device according to claim 1, the method comprising:
   transmitting a data signal via the at least one first data port of said device for receiving configuration information from the remote network component, said device being known to said remote network component;
   receiving at said device the configuration information from said remote network component for initializing said device; and
   establishing a data connection between said device and said remote network component using said configuration information.

16. The method according to claim 15, wherein the receiving is performed according to a Trivial File Transfer Protocol (TFTP).

17. The method according to claim 15, further comprising:
   connecting a data signal to the at least one second data port of said device for connecting said device to a peripheral, said peripheral having been made known to said remote network component before connecting;
   checking, by means of said device, if a MAC address of said peripheral and a MAC address communicated by said remote network component match; and
   forwarding a data connection of said remote network component to said peripheral if the MAC address of said peripheral matches the communicated MAC address.

18. The method according to claim 17, wherein an executable computer program product of said control unit of said device is operable to carry out said method.

* * * * *